United States Patent
Kleppe et al.

(10) Patent No.: US 10,401,607 B2
(45) Date of Patent: Sep. 3, 2019

(54) HIGH-RESOLUTION SCANNING MICROSCOPY RESOLVING AT LEAST TWO SPECTRAL RANGES

(71) Applicant: Carl Zeiss Microscopy GmbH, Jena (DE)

(72) Inventors: Ingo Kleppe, Jena (DE); Ralf Wolleschensky, Jena (DE); Yauheni Novikau, Jena (DE)

(73) Assignee: Carl Zeiss Microscopy GmbH, Jena (DE)

( * ) Notice: Subject to any disclaimer, the term of this patent is extended or adjusted under 35 U.S.C. 154(b) by 0 days.

(21) Appl. No.: 15/764,238

(22) PCT Filed: Sep. 29, 2016

(86) PCT No.: PCT/EP2016/073194
§ 371 (c)(1),
(2) Date: Mar. 28, 2018

(87) PCT Pub. No.: WO2017/055405
PCT Pub. Date: Apr. 6, 2017

(65) Prior Publication Data
US 2019/0056580 A1    Feb. 21, 2019

(30) Foreign Application Priority Data

Sep. 29, 2015  (DE) .................. 10 2015 116 435

(51) Int. Cl.
*G02B 21/00* (2006.01)
*G02B 21/36* (2006.01)
(Continued)

(52) U.S. Cl.
CPC ............. *G02B 21/361* (2013.01); *G02B 6/08* (2013.01); *G02B 21/008* (2013.01);
(Continued)

(58) Field of Classification Search
CPC ...... G02B 21/04; G02B 21/06; G02B 21/008; G02B 21/025; G02B 21/0032;
(Continued)

(56) References Cited

U.S. PATENT DOCUMENTS 5,043,570 A    8/1991  Takabayashi
5,731,588 A    3/1998  Hell et al.
(Continued)

FOREIGN PATENT DOCUMENTS

DE    44 16 558 C2    9/1997
DE    103 25 460 A1   11/2004
(Continued)

OTHER PUBLICATIONS

Stewart, Shona, et al.; "Raman Imaging"; Annual Review of Analytical Chemistry 2012; 5:337-360.
(Continued)

*Primary Examiner* — David E Smith
*Assistant Examiner* — Hsien C Tsai
(74) *Attorney, Agent, or Firm* — Duane Morris LLP

(57) ABSTRACT

For the purposes of high-resolution scanning microscopy, a sample is excited by illumination radiation to emit fluorescent radiation in such a way that the illumination radiation is focused at a point in or on the sample, so as to form a diffraction-limited illumination spot. The point is imaged in a diffraction image on a detector in a diffraction-limited manner, wherein the detector has detector elements and a plurality of location channels which resolve a diffraction structure of the diffraction image. The sample is scanned with various scanning positions with an increment smaller than half the diameter of the illumination spot. An image of the sample with a resolution that is increased beyond a resolution limit of the image is generated from the data of the detector and from the scanning positions associated with
(Continued)

these data. In order to distinguish between at least two predetermined spectral channels in the fluorescent radiation of the sample, for each location channel there is an independent beam path leading to a separating element that spectrally divides these beam paths into the spectral channels and then remixes the spectral channels of the different location channels into the same number, on additional independent beam paths, such that a plurality of the additional independent beam paths receive the radiation in different spectral channels and from different location channels, and each of these additional independent beam paths leads to one of the detector elements.

12 Claims, 3 Drawing Sheets

(51) Int. Cl.
  *G02B 27/58* (2006.01)
  *G02B 6/08* (2006.01)
  *G02B 21/06* (2006.01)
  *G02B 6/04* (2006.01)

(52) U.S. Cl.
  CPC ..... *G02B 21/0032* (2013.01); *G02B 21/0064* (2013.01); *G02B 21/0072* (2013.01); *G02B 21/0076* (2013.01); *G02B 21/06* (2013.01); *G02B 27/58* (2013.01); *G02B 6/04* (2013.01)

(58) Field of Classification Search
  CPC ............ G02B 21/0064; G02B 21/0072; G02B 21/0076; G02B 21/18; G02B 21/361; G02B 21/0833; G02B 21/0825; G02B 21/0816
  See application file for complete search history.

(56) References Cited

U.S. PATENT DOCUMENTS

| | | | |
|---|---|---|---|
| 5,866,911 A | 2/1999 | Baer | |
| 5,867,604 A | 2/1999 | Ben-Levy et al. | |
| 6,633,432 B2 | 10/2003 | Iketaki | |
| 6,909,105 B1 | 6/2005 | Heintzmann et al. | |
| 2004/0212799 A1 | 10/2004 | Hell | |
| 2008/0006858 A1 | 1/2008 | Liu | |
| 2009/0116008 A1 | 5/2009 | Fukuda et al. | |
| 2009/0134342 A1 | 5/2009 | Hell et al. | |
| 2011/0267688 A1 | 11/2011 | Kleppe et al. | |
| 2015/0008309 A1 | 1/2015 | Wolleschensky et al. | |
| 2015/0077842 A1 | 3/2015 | Kleppe et al. | |
| 2015/0077843 A1 | 3/2015 | Huhse | |
| 2015/0085099 A1* | 3/2015 | Kleppe .............. G02B 21/0064 348/80 |
| 2015/0185454 A1 | 7/2015 | Kalkbrenner et al. | |
| 2016/0131883 A1 | 5/2016 | Kleppe et al. | |
| 2016/0246042 A1 | 8/2016 | Enderlein et al. | |
| 2017/0227749 A1 | 8/2017 | Kleppe et al. | |

FOREIGN PATENT DOCUMENTS

| | | |
|---|---|---|
| DE | 10 2006 021 317 B3 | 10/2007 |
| DE | 10 2012 204 128 A1 | 9/2013 |
| DE | 10 2013 019 347 A1 | 2/2015 |
| DE | 10 2013 019 348 A1 | 2/2015 |
| DE | 10 2013 019348 A1 | 2/2015 |
| DE | 10 2013 015 931 A1 | 3/2015 |
| DE | 10 2013 015 932 A1 | 3/2015 |
| DE | 10 2013 015 933 A1 | 3/2015 |
| DE | 10 2013 017 468 A1 | 3/2015 |
| DE | 10 2014 111 167 A1 | 2/2016 |
| EP | 1 157 297 B1 | 3/2000 |
| EP | 2 037 255 A1 | 3/2009 |
| EP | 2 317 362 A1 | 5/2011 |
| WO | WO 2006/127692 A2 | 11/2006 |
| WO | WO 2013/135487 A1 | 9/2013 |
| WO | WO 2016/020459 A1 | 2/2016 |

OTHER PUBLICATIONS

Sheppard, Colin J.R., et al.; "Supperresolution by image scanning microscopy using pixel reassignment"; Optics Letters 2013; 38(15):2889-2892.

International Preliminary Report on Patentability dated Apr. 3, 2018 and English Translation.

Hell, Stefan W.; "Far-Field Optical Nanoscopy"; Science 2007; 316:1153-1158.

* cited by examiner

HIGH-RESOLUTION SCANNING MICROSCOPY RESOLVING AT LEAST TWO SPECTRAL RANGES

RELATED APPLICATIONS

The present application is a U.S. National Stage application of International PCT Application No. PCT/EP2016/073194 filed on Sep. 29, 2016 which claims priority benefit of German Application No. DE 10 2015 116 435.3 filed on Sep. 29, 2015, the contents of each are incorporated by reference in their entirety.

FIELD OF THE INVENTION

The invention relates to a method for high-resolution scanning microscopy of a sample, wherein the sample is excited by illumination radiation to emit fluorescence radiation wherein the illumination radiation is focused to a point in or on the sample to form a diffraction-limited illumination spot, the point is imaged in a diffraction-limited manner to a diffraction image on a spatially resolving detector device which has a spatial resolution that resolves a diffraction structure of the diffraction image, the point is displaced relative to the sample into different scanning positions with an increment of less than half the diameter of the illumination spot, intensity data is read from the detector device for each scanning position and an image of the sample is produced from the intensity data and the scanning positions assigned thereto, said image having a resolution increased beyond a resolution limit for imaging the point.

The invention further relates to a microscope for high-resolution scanning microscopy, comprising a sample space for receiving a sample which is excitable to emit fluorescent radiation, an optical unit which has a focal plane, located in the sample space, and a resolution limit, an illumination device, which has an entrance for supplying illumination radiation and illuminates, via the optical unit, the sample space with the illumination radiation in such a way that the optical unit focuses the illumination radiation to a point in the focal plane to form a diffraction-limited illumination spot, an imaging device for diffraction-limited imaging of the point in the focal plane to a diffraction image, via the optical unit, onto a detector device, the detection area of which lies in a detector plane conjugate to the focal plane, wherein the detector device has a spatial resolution which resolves a diffraction structure of the diffraction image, a scanning device for displacing the point into different scanning positions with an increment of less than half the diameter of the illumination spot, an evaluation device for reading intensity data from the detector device and for producing an image of the sample, said image having a resolution increased beyond a resolution limit, from the intensity data and the scanning positions assigned thereto.

One classical field of application of light microscopy for examining biological preparations is luminescence microscopy. Here, specific dyes (so-called phosphors or fluorophores) are used to specifically label samples, e.g. cell parts. The sample is illuminated with illumination radiation representing excitation radiation, and the luminescence radiation that has been excited thereby is captured using suitable detectors. In this way, representation of individual, differently colored cell parts in the microscope is possible. It is of course also possible for multiple parts of a preparation to be colored at the same time using different dyes which attach specifically to different structures of the preparation. This method is referred to as multiluminescence. It is also possible to measure samples that luminesce per se, i.e. without the addition of dye.

As is generally the case, luminescence is here understood to be the umbrella term for phosphorescence and fluorescence, i.e. it encompasses both processes. Where fluorescence is mentioned, this is intended to be understood pars pro toto and not in a limiting fashion.

For examining samples, it is also known to use laser scanning microscopes (also LSM for short) which use a confocal detection arrangement (in that case known as confocal LSM) or a non-linear sample interaction (known as multiphoton microscopy) to image only the plane that is located in the focal plane of the objective. An optical section is obtained, and the recording of multiple optical sections at different depths of the sample permits the generation of a three-dimensional image of the sample, which is made up of the different optical sections. Laser scanning microscopy is therefore suitable for examining thick preparations. A combination of luminescence microscopy and laser scanning microscopy is of course also used, in which a luminescent sample is imaged in different depth planes using an LSM.

In principle, the optical resolution of a light microscope, including that of an LSM, is diffraction-limited by physical laws. The term "high-resolution" is here used for resolutions beyond the diffraction limit.

U.S. Pat. No. 5,043,570 describes an attempt to increase the resolution by way of oversampling. This does not result in a significantly increased resolution below the diffraction limit of the microscope.

Using non-linear depopulation processes, the resolution can be raised to a factor of up to 10 with respect to a diffraction-limited confocal LSM. Such a method is described, for example, in U.S. Pat. No. 5,866,911. For depopulation processes, different approaches are known, for example those described in DE 4416558 C2, U.S. Pat. No. 6,633,432 or DE 10325460 A1.

Another high-resolution microscopy method is mentioned in U.S. Pat. No. 5,867,604, in which an object is scanned with a periodic structure. A similar method for increasing resolution is mentioned in EP 1157297 B1. Structured illumination uses non-linear processes, e.g. saturation of the fluorescence. The approach requires a reconstruction algorithm for image generation and the use of multiple recordings for an image.

A method that achieves high resolution in the wide field is known from WO 2006127692 and DE 102006021317. This method, shortened to PALM (photo-activated light microscopy) uses a labeling substance that can be activated using an optical activation signal. Only in the activated state can the labeling substance be excited using excitation radiation to emit specific fluorescent radiation. The activation is effected such that at least a specific portion of the activated labeling molecules are arranged at a distance from neighboring activated molecules such that they are separated, or can be separated retrospectively, measured on the optical resolution of the microscopy. After recording of the luminescent radiation, for said isolated molecules, the center of their radiation distribution due to resolution limits is ascertained and, on that basis, the position of the molecules is determined by way of calculation with greater accuracy than would actually be possible with optical imaging. To image the entire sample, the isolation of the labeling molecules of the subset by introducing the activation radiation, subsequent excitation and fluorescent radiation imaging is repeated until all labeling molecules, where possible, are included once in a subset and have been isolated.

Further high-resolution methods are described in Hell, "Far-Field Optical Nanoscopy," Science 316, 1153-1158, 2007 and in DE 102013017468 A1. EP 2037255 A1 relates to multi-spectral capture of sample light.

A method and microscope of the type mentioned in the beginning of this text are known from EP 2317362 A1. This is known as Airy scanning microscopy. In the described embodiment illustrated in FIG. 5 of this document, this document combines a diffraction-limited illumination of the sample with an area detector which resolves the diffraction image of the illuminated point. Consequently, the detector lies in a plane in which the pinhole would be in the case of a conventional LSM. A scanning device displaces the illumination spot over the sample and it is designed such that the diffraction image of the point illuminated by the illumination spot rests on the area detector. In the concept of EP 2317362 A1, the area detector provides a spatial resolution in the pinhole plane that, with reference to the imaging scale, effects oversampling of the diffraction image and thus permits, together with a special signal processing, the sampling of the diffraction structure of the diffraction image.

EP 2317362 A1 provides an embodiment in which color analysis is possible. Multiple detectors are provided herefor, with each detector being located in a particular spectral channel. These color channels are provided by a dichroic color splitter. This approach has long been known for laser scanning microscopy. However, it has the disadvantage that each color channel requires its own color splitter and detector. In conventional laser scanning microscopy, which uses a non-spatially resolving detector behind a confocal pinhole, this requirement is largely unproblematic; but using an oversampling area detector in accordance with EP 2317362 A1 is associated with a considerable outlay, especially since such area detectors are expensive. In addition, in the oversampling principle in accordance with EP 2317362 A1, these multiple area detectors would need to be adjusted at subpixel accuracy with respect to one another, since otherwise a chromatic aberration between the images produced in the individual color channels would occur, which aberration would be caused by the data of the area detectors being offset to the scanning position, which for high-resolution images is shifted in increments that are small with respect to the diameter of the illumination spot. The images of the individual color channels fit over one another only if the area detectors are adjusted at subpixel accuracy with respect to the optical axis for all color channels.

DE 102013019378 A1 proposes a development for enabling a color analysis for the microscope known from EP 2317362 A1, in which the two spatially resolving area detectors are formed by two optical fiber bundles that lead the radiation to a detector having multiple detector elements. Half of the detector elements are connected to one optical fiber; the other half is connected to the other optical fiber. A spectrally dividing element ensures that the two optical fibers receive radiation in different spectral channels. Consequently, the color information is obtained at the expense of a greatly reduced spatial resolution. This problem gets worse with an increasing number of colors.

DE 102012204128 A1, DE 102013015931 A1, DE 102013015932 A1, DE 102013019347 A1, DE 102013019348 A1, WO 2013/135487 A1 and DE 102013015933 A1 develop the concept of EP 2317362 A1.

A development of the Airy scan microscopy for producing at least two-tone images is described in the subsequently published German application DE 102014111167 A1.

DESCRIPTION OF THE INVENTION

It is an object of the invention to develop a method and a microscope of the type set forth at the outset in such a way that color information can be obtained, at reduced or even no adjustment outlay for multiple color channels and, at the same time, the obtained spatial resolution not being reduced where possible. A multiplicity of color channels shall be possible, too.

According to the invention, this object is achieved by a method for high-resolution scanning microscopy of a sample, wherein the sample is excited by illumination radiation to emit fluorescence radiation wherein the illumination radiation is focused to a point in or on the sample to form a diffraction-limited illumination spot, the point is imaged in a diffraction-limited manner to a diffraction image on a detection area of a spatially resolving detector device, wherein the detection area has spatial channels that define a spatial resolution of the detector device, which resolution resolves a diffraction structure of the diffraction image, the detector device has detector elements for detecting radiation of the diffraction image, wherein for each of the plurality of the spatial channels, the radiation guided these channels is spectrally divided into multiple spectral channels and merged together again to form mixed channels, wherein radiation originating from different spatial channels is merged to each mixed channel and radiation from various spectral channels is also merged to the plurality of mixed channels, and each mixed channel is guided to one of the detector elements, wherein the point is displaced relative to the sample into different scanning positions with an increment of less than half the diameter of the illumination spot, intensity data is read from the detector elements for each scanning position and an image of the sample is produced from the intensity data and the scanning positions assigned thereto, said image having a resolution increased beyond a resolution limit for imaging the point, wherein the spectral channels and spatial channels of the radiation are taken into account for each detector element and the image of the sample is produced in a multi-spectral manner.

In particular, provision is made for a method for high-resolution scanning microscopy of a sample, wherein the sample is excited by illumination radiation to emit fluorescence radiation, wherein the illumination radiation is focused to a point in or on the sample to form a diffraction-limited illumination spot, the point is imaged in a diffraction-limited manner to a diffraction image on a detection area of a spatially resolving detector device, wherein the detection area has spatial channels that define a spatial resolution of the detector device, which resolution resolves a diffraction structure of the diffraction image, the detector device having at least as many detector elements as spatial channels, wherein radiation of the diffraction image, which is incident on the spatial channels, is guided to the detector elements, the detector device has a spectral splitting and mixing device which splitting the radiation received in each spatial channel into multiple spectral channels, wherein there is an individual assignment of spatial channels to the detector elements for each of the spectral channels such that multiple detector elements receive radiation in different spectral channels and from different spatial channels, wherein the point is displaced relative to the sample into different scanning positions with an increment of less than half the diameter of the illumination spot, intensity data is read from the detector elements for each scanning position and an image of the sample is produced from the intensity data and the scanning positions assigned thereto, said image having a resolution increased beyond a resolution limit for imaging the point, wherein the spectral channels and spatial channels assigned to a given detector element are taken into account for each detector element and the image of the sample is produced in a multi-spectral manner.

The object is further achieved by a microscope for high-resolution scanning microscopy, the microscope comprising a sample space for receiving a sample which is excitable to emit fluorescent radiation, an optical unit which has a focal plane, located in the sample space, and a resolution limit, an illumination device, which has an entrance for receiving illumination radiation and illuminates, via the optical unit, the sample space with the illumination radiation in such a way that the optical unit focuses the illumination radiation to a point in the focal plane to form a diffraction-limited illumination spot, an imaging device for diffraction-limited imaging of the point in the focal plane to a diffraction image by the optical unit, a spatially resolving detector device having a detection area lying in a plane that is conjugate to the focal plane, wherein the detection area has spatial channels that define a spatial resolution of the detector device, which resolution resolves a diffraction structure of the diffraction image, the detector device has detector elements for detecting radiation of the diffraction image, the detector device has a splitting and mixing device which, for each of the plurality of the spatial channels, spectrally splitting the radiation guided thereto into multiple spectral channels and merges these together again to form mixed channels, wherein the splitting and mixing device merges radiation originating from different spatial channels into each mixed channel and also radiation from various spectral channels into the plurality of mixed channels and guides each mixed channel to one of the detector elements, a scanning device for displacing the point into different scanning positions with an increment of less than half the diameter of the illumination spot, an evaluation device for reading intensity data from the detector elements and the scanning positions assigned thereto, and for producing an image of the sample from the intensity data and the scanning positions assigned thereto, said image having a resolution increased beyond the resolution limit of the optical unit, wherein the evaluation device takes into account the spectral channels and spatial channels of the radiation supplied thereto for each detector element and produces the image of the sample in a multi-spectral manner.

In particular, provision is made of a microscope for high-resolution scanning microscopy, comprising a sample space for receiving a sample which is excitable to emit fluorescent radiation, an optical unit which has a focal plane, located in the sample space, and a resolution limit, an illumination device, which has an entrance for supplying illumination radiation and illuminates, via the optical unit, the sample space with the illumination radiation, wherein the optical unit focuses the illumination radiation to a point in the focal plane to form a diffraction-limited illumination spot, an imaging device for diffraction-limited imaging of the point in the focal plane to a diffraction image by the optical unit, a spatially resolving detector device having a detection area lying in a detector plane that is conjugate to the focal plane, wherein the detection area has spatial channels that define a spatial resolution of the detector device, which resolves a diffraction structure of the diffraction image, the detector device has at least as many detector elements as spatial channels, wherein the radiation of the diffraction image incident on the spatial channels is guided to the detector elements, the detector device has a spectral splitting and mixing unit which spectrally divides the radiation received in each spatial channel into multiple spectral channels, wherein the splitting and mixing unit individually assigns of spatial channels to detector elements for each of the spectral channels in such a way that multiple detector elements receive radiation in different spectral channels and from different spatial channels, a scanning device for displacing the point into different scanning positions with an increment of less than half the diameter of the illumination spot, an evaluation device for reading intensity data from the detector elements and the scanning positions assigned thereto, and for producing an image of the sample is produced from the intensity data and the scanning positions assigned thereto, said image having a resolution increased beyond the resolution limit of the optical unit, wherein the evaluation device takes into account the spectral channels and spatial channels assigned thereto for each detector element and produces the image of the sample in a multi-spectral manner.

The principle that is known from EP 2317362 A1 and onto which the microscope and method described here are based records the radiation in a multiplicity of spatial channels in the detection plane. Said spatial channels are dimensioned such that the diffraction structure of the diffraction image is resolved. In order to achieve a spectral resolution, the radiation of each spatial channel is detected in a dedicated beam path. A splitting element divides the radiation of the plurality of spatial channels into multiple spectral channels and then mixes the divided radiations from the various, preferably various spatial channels and various spectral channels, to form new independent beam paths, i.e. mixed channels. Hence, the mixed channels contain radiations in different spectral channels and from different spatial channels at the same time. Each of the mixed channels then terminates in a detector element which measures the summed intensity of the radiation in this mixed channel. It is known from which combined spatial channels and spectral channels the detector element receives radiation. Using this information, the signal analysis process can obtain both spatial data, which goes beyond the diffraction limit of the imaging, and color data.

Mixing is done by spectrally separating the received radiation into multiple spectral channels for the plurality of spatial channels. At this stage, multiple spectral channels are available for each spatial channel. Then, these spectral channels are merged back to the mixed channels, wherein, naturally, it is not the spectral channels of one spatial channel that are combined again, but spectral channels of different spatial channels and/or spatial channels of different spectral channels are re-combined. As a result, the splitting and mixing device individually assigns spatial channels to detector elements for each of the spectral channels. Then, multiple, in particular all detector elements receive radiation in the various spectral channels and from various spatial channels.

This mixing or redistributing of spectral information and spatial channels can be considered physically to be a manipulation of the point spread function (PSF). On the detection area, the point spread function is provided in a diffraction-limited manner by the imaging or the optical unit, for example in the form of an Airy disk as already mentioned. Now, when forwarding radiation to the radiation-sensitive detector elements, this point spread function is manipulated by redistributing spatial channels and spectral information in such a way that color information and spatial information are mixed on the radiation-sensitive detector elements such that they are distributed differently than in the detection area/pinhole plane. Then, unmixing and reconstruction is always still possible without problems since, on account of the small increment which spaces the scanning positions apart from one another, each diffraction image of a punctiform emitter in the sample is imaged multiple times at different positions on the detection area and captured by the point spread function that has been manipulated by the redistribution.

The quality of the spectral separation is substantially dominated by the quality of the spectral division in the spectral splitting and mixing element, but not by errors when obtaining image information, i.e. the data-based unmixing. By way of example, mixing can be carried out by a fiber coupler in the detector plane, i.e. in the plane in which the detection area lies, as a result of which the beam paths of the spatial channels can be parallelized in a virtually crosstalk-free manner and can be redistributed as desired. Subsequently, there is a spectral splitting, i.e. a chromatic division for the individual spatial channels.

Ideally, the spectral channels of the spatial channels are then mixed together again such that the effective point spread functions for the spectral channels that are merged into a mixed channel differ as great as possible. In this way, the system of equations formed to obtain the spatial and color information (unmixing) contains many linearly independent equations.

The procedure according to the present invention obtains spectral data from one detector device without reducing the number of spatial channels. Ultimately, the number of spatial channels affects how good the produced image is resolved beyond the spatial resolution of the optical unit. In the approaches of the prior art, in which a dedicated detector is used for each spectral channel, the number of detector elements equals the product of the number of spatial channels and the number of spectral channels. By contrast, it is preferred for the invention that the number of employed detector elements is smaller than this product. Particularly preferably, the number of detector elements equals the number of spatial channels.

It is possible within the scope of the present invention to feed some detector elements with radiation from only one single spectral channel or one single spatial channel, for example in order to produce a spectral reference signal or neutral reference signal which can be used for normalizations, for example. However, in view of maximum spatial and spectral resolution, it is preferable for each detector element to receive radiation from at least two, preferably from all spectral channels.

A method known from the prior art is to use detectors for recording the diffraction image, the geometry of the detector deviates from the image field that is required in the detection area, by providing a redistribution element in the form of an optical fiber bundle, wherein the entry facets lie in an entry area of the bundle and form the detection area. Hence, the entry facets of the optical fibers define the spatial channels. In a development of this known concept, the spectral splitting and mixing device is disposed downstream of the optical fibers and has individual splitting elements, wherein an individual splitting element is assigned to each spatial channel such that each optical fiber guides the radiation of the respective spatial channel guided thereby to one of the individual splitting elements and this splitting element divides the radiation of this spatial channel into the spectral channels. Subsequently, the radiation can then be guided as a free beam optics to a detector having the detector elements, wherein the geometry in which the detector elements are arranged and the geometry in which the individual splitting elements are arranged are matched to one another. By way of example, if a detector row is used as a detector, the individual splitting elements are also lined up in a row. Alternatively, it is possible to couple the radiation into optical fibers extending after the individual splitting elements and each of these optical fibers then leads to one of the detector elements.

An Airy disk arises when diffracting an optical beam at a circular stop. It appears as a central maximum, the Airy disk, which is surrounded by rings of reducing radiation intensity. Even a microscope that is perfect according to the laws of geometrical optics, i.e. even without imaging aberrations, cannot image a point exactly on a point, but only to a blurred spot as a result of the diffraction of light at the aperture. This is referred to as diffraction-limited imaging. The same applies in the case of diffraction-limited illumination to a point. In classical beam optics, two points can be separated according to the so-called Rayleigh criterion if the maxima of their images in the diffraction image are spaced apart by at least the radius r of the Airy disk. The shape of the spot has a reciprocal relationship to the shape of the aperture; in particular, its size is inversely proportional to the size of the aperture. The size of the Airy disk comes from the first zero of the Bessel function of the first kind, which lies at approximately $r=0.6098$. The Airy disk (i.e. the central diffraction spot) is named after the English astronomer George Biddell Airy. In the scanning microscope, the aperture, given by the round mounts of the optical units, is circular both in the illumination and in the imaging. Since the size of the Airy disk moreover depends on the wavelength, it is smaller for the diffraction-limited illumination serving for excitation purposes than for the Stokes-shifted, i.e. longer wavelength fluorescence radiation. The term "diffraction-limited" is here not intended to be limited to the diffraction limit in accordance with Abbe's theory, but also to cover cases in which the theoretical maximum is missed by 20% for reasons of real inadequacies or limitations. Even here the individual image has a structure that is referred to as diffraction structure. It is oversampled.

Since a multiplicity of measurements are available for each individual point in the sample in the reconstruction method according to EP 2317362 A1 on account of the scanning displacement with an increment that is smaller than the size of the illumination spot, this yields an overdetermination of the system of equations set up and solved. So it is possible to obtain not only the loci properties and intensities for the individual points with a high resolution, but also the specification of spectral regions, i.e. the color.

The concept according to the invention can also be carried out simultaneously in a parallelized form for a plurality of spots, as is known for laser scanning microscopy. Then, a plurality of spots on the sample are scanned and the individual images of the plurality of spots lie at rest next to one another in the detection plane. The following description concentrates in an exemplary manner on single point spot scanning. However, this should not be understood to be a limitation and the explained features and principles also apply equally to parallel scanning of a plurality of point spots and to the use of a line spot. Naturally, the latter is diffraction-limited only transversely to the direction of the line, and so the features of this description in this respect then only apply in one direction (transversely to the extent of the line).

Imaging of a desired region of the sample is effected in a scanning manner, as in a typical LSM. Since illumination and imaging or the corresponding devices have a common optical scanning device that guides the illumination spot over the sample and at the same time descans, with respect to the detector, the point which coincides with the illumination spot and at which the sample is imaged, a zoom optical unit can be placed in the common part of illumination and imaging device. Said unit permits to adapt the diffraction image to the size of the area detector and additionally to couple the available illumination radiation, without absorption on mounts, completely into the objective pupil, the size of which can vary with selection of the objective.

The resolution of the diffraction structure of the individual image additionally allows to detect a movement direction of the spot, along which the latter is displaced when scanning the sample. Although, in principle, this movement direction is known from the mechanism of the scanner (for example of a scanning mirror or a movable sample stage), there are residual inaccuracy here on account of the mechanics. These can be eliminated by virtue of evaluating signals of individual pixels of the detector array by a cross correlation. Here, use is made of the fact that related adjacent image pixels in the sample overlap to a certain extent on account of the diffraction-limited imaging of the illuminated point, but the centers thereof lie next to one another. If the signals of such image pixels are subjected to a cross correlation analysis, it is possible to reduce or completely eliminate a residual inaccuracy which remains on account of unavoidable tolerances of the scanning mechanism.

Where a method is described here, an evaluation device, e.g. a control device, implements these method steps during operation of the microscope.

It goes without saying that the aforementioned features and those yet to be explained below can be used not only in the combinations specified but also in other combinations or on their own, without departing from the scope of the present invention.

BRIEF DESCRIPTION OF THE DRAWINGS

The invention is explained in more detail below for example on the basis of the accompanying drawings, which also disclose features essential to the invention. In the figures.

DETAILED DESCRIPTION OF THE DRAWINGS

Figure 1:
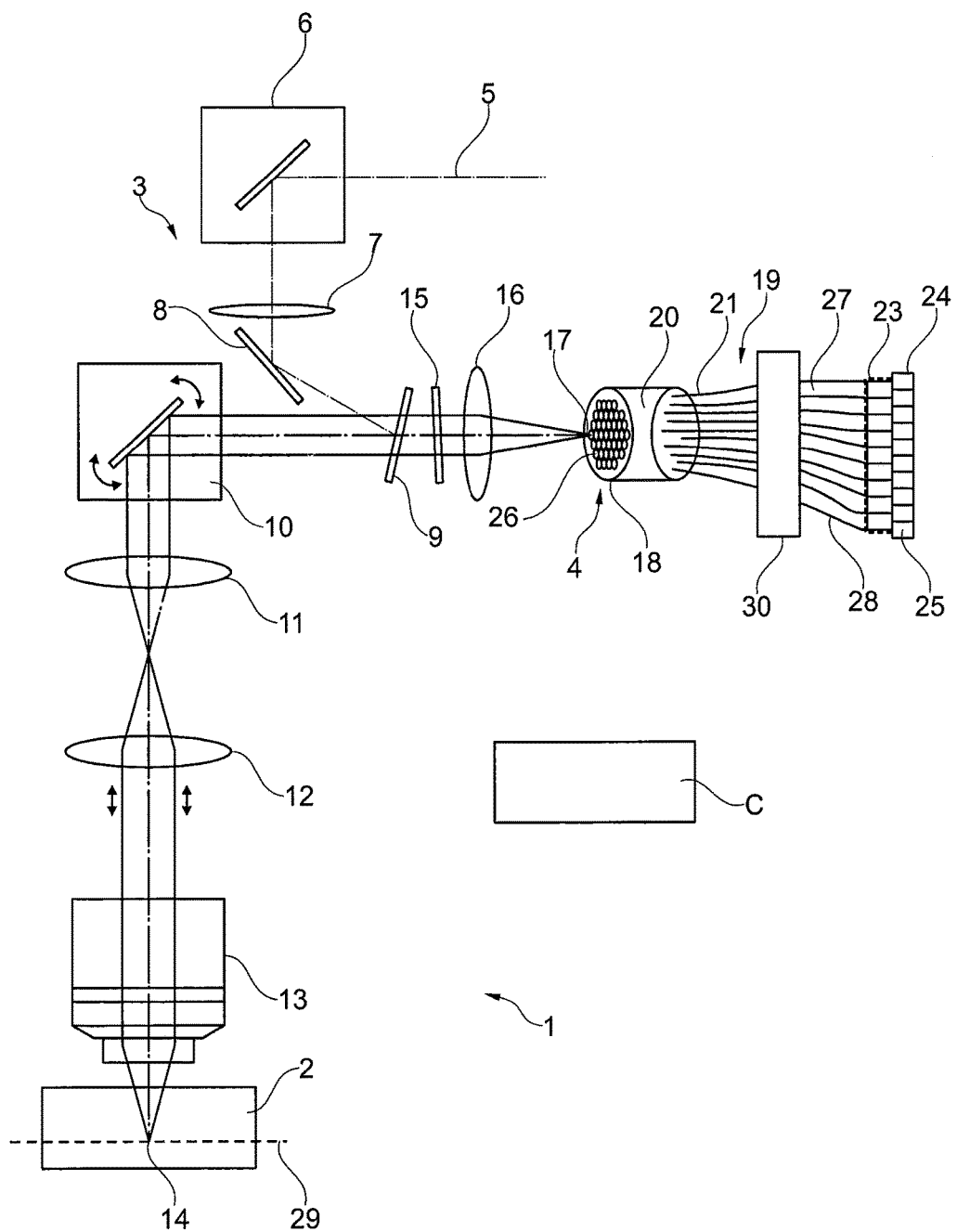
FIG. 1 shows a schematic illustration of a laser scanning microscope for high-resolution microscopy.

FIG. 1 schematically illustrates a laser scanning microscope 1 configured for microscopy of a sample 2. The laser scanning microscope (referred to below as LSM) 1 is controlled by a control device C and comprises an illumination beam path 3 and an imaging beam path 4. The illumination beam path illuminates a spot in the sample 2, and the imaging beam path 4 images said spot in a diffraction-limited manner for detection. Illumination beam path 3 and imaging beam path 4 share an optical unit.

The sample 2 is illuminated in the LSM 1 using a provided laser beam 5 which is coupled to a mirror 8 via a deflection mirror 6, which is otherwise not functionally necessary, and a lens 7. The mirror 8 ensures that the laser beam 5 is incident on an input coupling element, e.g. an emission filter 9, at a reflection angle. For clarity, only the principal axis is drawn for the laser beam 5.

After the laser beam 5 is reflected at the emission filter 9, it is biaxially deflected by a scanner 10 and focused in the form of a diffraction-limited illumination spot 14 in a focal plane 29 in the sample 2 using lenses 11 and 12 and through an objective 13. Here, the illumination spot 14 in the illustration in FIG. 1 is punctiform; however, an illumination spot in the form of a line is also possible. Fluorescence radiation that was excited at the location (e.g. point) of the illumination spot 14 is guided out of the focal plane 29 via the objective 13 and the lenses 11 and 12 back to the scanner 10, after which a static light beam is once again present in the imaging direction. This beam passes through the emission filter 9, which here additionally has the function of selecting fluorescence radiation in the illumination spot 14 with respect to its wavelength and to block illumination radiation of the laser beam 5 that can serve, for example, as excitation radiation. Additionally, provision an optional emission filter 15 for blocking the illumination radiation is provided. A lens 16 ensures that, overall, the location of the illumination spot 14 is imaged to a diffraction-limited diffraction image 17, which is located in a detection plane 18. The detection plane 18 is a plane conjugate to the focal plane 29, in which the illumination spot 14 in the sample 2 is located.

The diffraction image 17 of the illumination spot 14 is recorded in the detection plane 18 by a detector device 19. It spatially resolves the diffraction-limited image 17 of the spot 14 in the detection plane 18, i.e. effects oversampling in the pinhole plane.

A control device C controls all components of the LSM 1, in particular scanner 10 and detector device 19. The control device captures the data of each individual image 17 for different scan positions, analyzes the diffraction structure thereof and produces a high-resolution total image of the sample 2, as will still be explained below.

The LSM 1 in FIG. 1 is illustrated by way of example for a single illumination spot 14, which is scanned on the sample. However, it can also be used simultaneously for scanning in accordance with a line illumination spot which extends, for example, perpendicularly to the drawing plane of FIG. 1. It is also possible for the LSM 1 in FIG. 1 to be configured such that a plurality of point illumination spots that are disposed next to one another are scanned in the sample. Their corresponding diffraction images 17 are in that case likewise disposed next to one another in the detection plane 18. The detector device 19 is then correspondingly configured to detect the diffraction images 17 that are disposed next to one another in the detection plane 18.

The detector device 19 comprises an optical fiber bundle 20 which, with the interposition of a splitting and mixing unit 30, feeds a detector array 24. The optical fiber bundle 20 is made up of individual optical fibers 21. Entry facets 26 of the optical fibers 21 form an optical fiber bundle entrance, which is located in the detection plane 18. The entry facets 26 of the optical fibers 21 consequently provide an entrance of spatial channels or pixels, by means of which the diffraction image 17 of the illumination spot 14 is received.

Since the illumination spot 14 in the embodiment of FIG. 1 is, by way of example, a point spot, the diffraction image 17 is an Airy disk, the extent of which lies within the circle that illustrates the detection plane 18 in FIG. 1. It should be noted that FIG. 1 contains a simplification in this respect. The extent of the optical fiber bundle entrance is so large that it covers the extent of the diffraction image 17.

Figure 5:
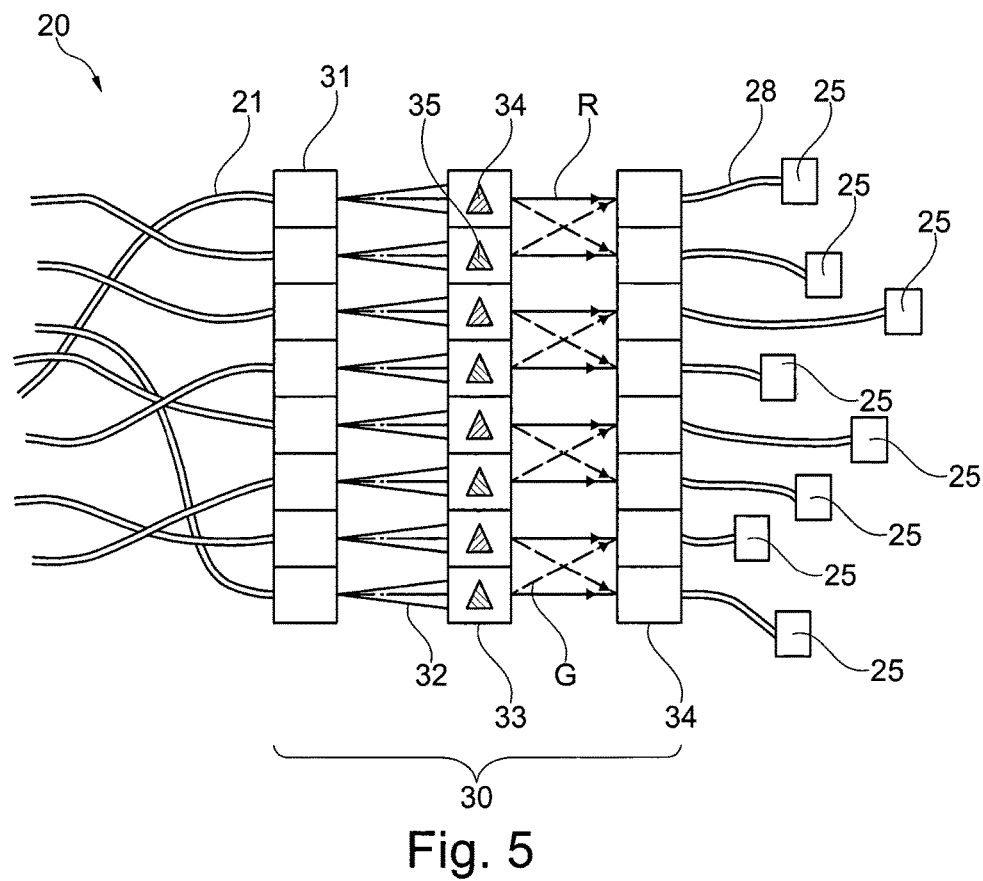
FIG. 5 shows a schematic illustration of an embodiment of the splitting and mixing element of the microscope shown in FIG. 1.

The individual optical fibers 21 in the optical fiber bundle 20 are connected with their outputs to the splitting and mixing device 30, an embodiment of which is shown in FIG. 5. From there, a further optical fiber bundle 27 with optical fibers 28 runs to e.g. an elongate plug 23, in which the output-side ends of the optical fibers 28 lie next to one another. The plug 23 has an embodiment that fits to a geometric arrangement of the detector row 24, i.e. each output-side end of an optical fiber 28 lies exactly in front of a detector element 25 of the detector row 24.

Reference is made to the fact that the embodiment of the detector device 19 is exemplary in view of the coupling and integration of the splitting and mixing device 30. In principle, a detector device 19 which undertakes oversampling of the diffraction image 17 in the detection plane 18 and which guides the spatial channels created thus to detector elements 25 via the splitting and mixing device 30 suffices. In particular, this can also be a rectangular detector area with pixels that realize the detector elements.

Without the splitting and mixing device 30, a diffraction image 17 that is an Airy disk on account of the circular aperture of the objective 13 would arise in the associated conjugate detection plane 18 in the case of diffraction-limited imaging of the point, illuminated by the illumination spot 14, in the focal plane 29. How such Airy disks form was already explained, in the general part of the description. In the microscopy technique as described in EP 2317362 A1, the structure of the diffraction image 17 is analyzed by oversampling, and, in conjunction with the scanning positions that have an increment that is small in relation to the minimum dimension of the illumination spot 14, there can be a structure resolution which goes beyond the resolution limit of the diffraction-limited imaging.

In order to explain this principle, two hypothetical locations are considered which lie so closely together in the focal plane 29 that they cannot be resolved within diffraction-limited resolution. When scanning the illumination spot 14 with increments that are small in relation to the diameter of the illumination spot (that is circular in this hypothetical locations experiment), one of the two locations enters the illumination spot first. The radiation intensity in the diffraction image 17 increases as ever more of this first location enters the illumination spot 14. On account of its diffraction-limited properties, the illumination spot 14 has an intensity that increases toward the center. Consequently, the intensity of the radiation in the diffraction image 14 increases to the extent with which the considered first location moves more and more into the center of the illumination spot 14. Once the center of the illumination spot 14 has migrated over the considered location, the intensity of the radiation coming from this first location reduces again. If there were no neighboring hypothetical locations second location, the radiation intensity in the diffraction image 17 would decay again, with the increase and the reduction in the radiation intensity in the diffraction image 17 correlating exactly with the profile of the illumination intensity of the illumination spot 14 (taking account of the increment and the fluorescence-sensitivity of the first location). However, since the second location is present in close proximity, this second location likewise begins to add fluorescence radiation to the diffraction image 17, to be precise ever more, the closer the center of the illumination spot 14 comes thereto. Otherwise, exactly the same naturally applies to the second location as to the first location. Overall, illumination intensities are obtained in the diffraction image 17 for the increment positions which are different than if only a single fluorescent place were present. By evaluating the data of the area detector 19 and taking account of the current scanning position, it is consequently possible to mathematically detect that two locations fluoresce in the focal plane 29, and also the spacing there between, even though these two locations would not be identifiable at diffraction-limited resolution alone. In technical implementations known to a person skilled in the art, an equation is set up for each scanning position for the purposes of evaluating the data of the area detector 19, said equation containing multiple unknowns, in particular the intensity and spacing of the locations in the focal plane 29. As a result of the multiplicity of scanning positions, a system of equations is obtained that is overdetermined and allows to determine radiation intensity and spacing, i.e. consequently also the position, of the fluorescent locations. This will still be explained below.

Figure 2:
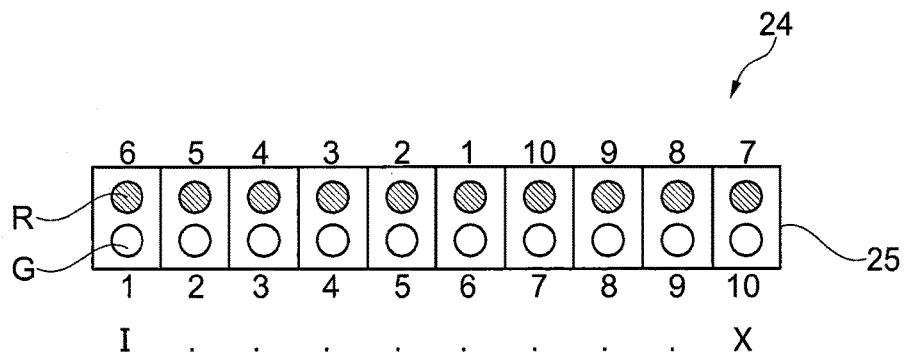
FIG. 2 shows a schematic illustration of how radiation from various spatial channels and various spectral channels is mixed on the detector elements of the microscope shown in FIG. 1, FIG. 3 graphically illustrates of the point spread function of the input to a detector device of the microscope from FIG. 1, with the point spread function being plotted for two colors.

The splitting and mixing device 30 manipulates the point spread function given in the detector plane 18. The beam profile is redistributed spatial channel by spatial channel, i.e. pixel by pixel. In order to make this redistribution more easily understandable, a two-tone spectral data, i.e. the use of two spectral channels, is considered as a simple example in a case with ten spatial channels. The spatial channels are denoted using the Arabic numerals 1 to 10. The ten spatial channels correspond to ten detector elements 25, which are numbered by I to X for the explanation. Similarly, the optical fiber bundle 20 then has a total of ten input facets 26; that is to say, ten spatial channels lead to the splitting and mixing device 30. The splitting and mixing device 30 divides each of these spatial channels into two spectral channels, for example a red spectral channel R and a green spectral channel G. Then, the splitting and mixing device 30 mixes two different spectral channels from two different spatial channels, always in pairs, and thus forms ten mixed channels. These are guided to the detector elements 25. FIG. 2 schematically shows the state obtained in that case. Here, the ten detector elements 25 with the numbers I . . . X are plotted schematically as boxes, for each of which the spectral channel R and the spectral channel G from different spatial channels are recombined. Plotted under the detector row 25 are the numbers 1 to 10 of the spatial channels from which the radiation of the spectral channel G originates. Plotted above the detector row 24 are the corresponding numbers 1 to 10 of the spatial channel from which the spectral channel R originates. By way of example, the detector elements 25 with the number I contains the green spectral channel G from the spatial channel number 1 and the red spectral channel R from the spatial channel number 6.

Figure 3:
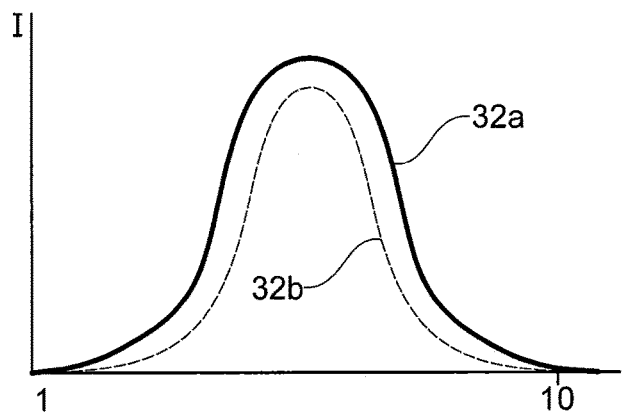
Figure 4:
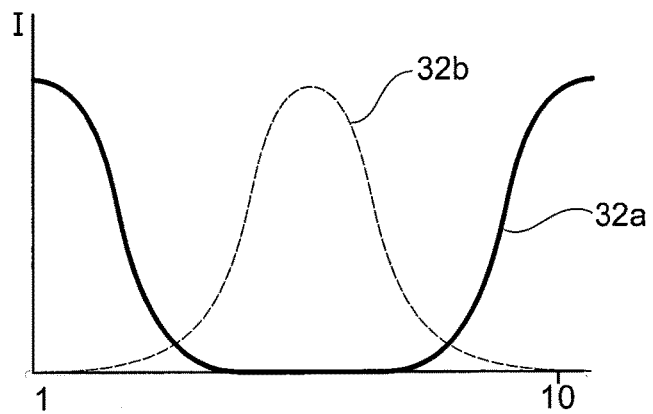
FIG. 4 is a graphical illustration of the point spread function resulting from a splitting and mixing device of the microscope shown in FIG. 1.

FIGS. 3 and 4 show the effect of this spatial-channel-by-spatial-channel re-sort. FIG. 3 shows the point spread function in the detector plane 18, in a simplified fashion as a linear sectional illustration over the spatial channels with the numbers 1 to 10. Here, the point spread function 32a applies to the red spectral channel R; the point spread function 32b applies to the green spectral channel G. The effect of the splitting and mixing device on these point spread functions can be seen in FIG. 4. The point spread function for the red spectral channel R now differs fundamentally from that of the green spectral channel G.

By way of example, if an illumination spot migrates over the detection area 18 during the scanning process, the sequence with which the intensity decreases or increases at the individual detector elements 25 numbered I to X differs significantly for an object point that fluoresces in the red color channel R in relation to an object point that fluoresces in the green color channel G. By way of example, in the case of a red color channel R, the detector elements 25 numbered I to III would initially indicate a high radiation intensity, followed by the other detector elements 25 thereafter, whereas, in the case of an object point fluorescing in the green color channel G, the detector elements numbered IV to VI would initially indicate a high intensity.

As a result of this drastic color-dependent modulation of the point spread function, simple unmixing of the color information on the detector row 25 is possible when setting up the system of equations. The control device C, which acts as an evaluation device, is aware of the assignment which the splitting and mixing device 30 undertakes during splitting and mixing, and so the control device C not only produces an image with a spatial resolution that goes beyond the optical resolution of the microscope 1 during the image production, but also at the same time supplies information about the spectral channels.

Naturally, the explanation on the basis of FIGS. 2 and 4 with two color channels and ten spatial channels and ten detector elements 25 is purely exemplary and should only serve for the understanding of the inventive principle. Naturally, use can also be made of a greater number of color channels and a different number of spatial channels and detector elements.

FIG. 5 shows, in an exemplary manner, a possible realization for the splitting and mixing device 30. It comprises an input coupler 31, to which the optical fibers 21 of the optical fiber bundle 20 are coupled. As shown in FIG. 5, the optical fibers 21 can already undertake a re-sort such that desired spatial channels lie next to one another at the input coupler 31. Then, the optical fiber bundle 20 is a functional part of the splitting and mixing device 30.

From the input coupler 31, the radiation 32 in each spatial channel is guided to a row 33 of individual splitting elements, for example different prisms 34 and 35. These prisms guide the radiation, once again plotted here in an exemplary manner for two color channels R and G, to an output coupler 34, to which the optical fibers 28 are connected. In the design accordingly to FIG. 5, these lead to individual detector elements 25. This should show that a group of individual, i.e. independent detector elements 25 can also be used instead of a detector row 24. Alternatively, it is also possible to replace the output coupler 34 by the detector row. The row 33 of individual splitting elements 34, 35 should then optionally be complemented by a downstream optical unit, for example a mini-lens optical unit, etc., which guides the radiation onto the detector row.

The splitting and mixing device 30 divides the radiation from the spatial channels into different spectral channels, in this case R and G, and mixes the divided radiation together again such that mixed channels are obtained. By way of example, the lowermost channel in the illustration of FIG. 5 contains the red spectral channel R from the radiation 32 originating from the spatial channel that is connected to the lowermost connector of the input coupler 31. Further, this mixed channel contains the green spectral component G originating from the radiation 32 of that spatial channel that was fed to the connector lying directly above in the input coupler 31. In combination with the re-distribution done by the optical fiber bundle 30 this realizes a substantially freely determinable dividing and re-sort by the splitting and mixing element 30.

For a better explanation of the mathematical analysis of the construction of the system of equations, initially, a case without splitting and mixing device 30 is considered only by way of introduction. If O(r) denotes the object, E(r) denotes the point spread function (PSF) of the excitation, and H(r) denotes the PSF of the detection, for each image point the following equation is obtained as signal D(r,p), wherein r denotes the distance from the location p of the illumination spot:

$$D(r, p) = \int_r O(p - r')E(r')h(r' + r)dr' \tag{1}$$

A Fourier transform of D(r,p) with respect to the location p gives:

$$D(r,\omega) = O(\omega)FT_{r'}\{E(r')H(r'+r)\}$$

The product in real space becomes the following convolution in Fourier space:

$$D(r, \omega) = O(\omega) \int_\omega E(\omega')H(\omega - \omega')e^{i(\omega - \omega')r}d\omega' \tag{2}$$

If a support function is introduced at the location r:

$$EH(r,\omega) = FT_{r'}\{E(r')H(r'+r)\}$$

The following emerges from equation (2):

$$D(r,\omega) = O(\omega)EH(r,\omega) \tag{3}$$

Different locations r on the area detector are combined by means of a Wiener filter (cf. http://en.wikipedia.org/wiki/Wiener_deconvolution)

$$\tilde{O}(\omega) = \frac{\sum_r D(r, \omega)EH^*(r, \omega)}{\langle |n(\omega)|^2 \rangle / \langle |O(\omega)|^2 \rangle + \sum_r |EH(r, \omega)|^2}, \tag{4}$$

where $\langle |O(\omega)|^2 \rangle$ and $\langle |n(\omega)|^2 \rangle$ are the corresponding spectral power densities of the signal ("O") and of the noise (n).

Equation (2) of the recombination in Airy scanning microscopy applies to one color (below, the term "color" is used as a simpler expression for the term "spectral channel"). A plurality of colors are mixed at each location r, wherein weighting factors play a role with which the splitting and mixing device 30 combines the individual spectral channels and spatial channels to the mixed channels. Then, the following is obtained:

$$D(r, \omega) = \sum_c O_c(\omega)EH_c(r, \omega) + bB(\omega). \tag{5}$$

Here, b is an offset and B(ω) is an offset spectrum:

$$B(\omega) = \begin{cases} 1, \omega = 0 \\ 0, \omega \neq 0 \end{cases}. \tag{6}$$

The offset can be considered to be an additional color $O_{c+1}(\omega)=b$, the weight of which is $EH_{c+1}(r,\omega)=B(\omega)$. Hence, equation (5) can be rewritten in the following form:

$$D(r, \omega) = \sum_{\hat{c}} O_{\hat{c}}(\omega) EH_{\hat{c}}(r, \omega). \quad (7)$$

The colors can be unmixed by means of a linear regression for each frequency $EH_{c+1}(r,\omega)=B(\omega)$:

$$\sum_{r} \left| D(r, \omega) - \sum_{\hat{c}} O_{\hat{c}}(\omega) EH_{\hat{c}}(r, \omega) \right|^2 = \min. \quad (8)$$

Minimizing equation (8) in view of the value of $O_x(\omega)$ leads to a system of linear equations for each frequency $EH_{c+1}(r, \omega)=B(\omega)$:

$$\sum_{r} D(r, \omega) EH_x^*(r, \omega) = \sum_{\hat{c}} O_{\hat{c}}(\omega) \left\{ \sum_{r} EH_{\hat{c}}(r, \omega) EH_x^*(r, \omega) \right\}. \quad (9)$$

If the offset is expanded, the following is obtained:

$$\begin{cases} \sum_{r} D(r, \omega) EH_x^*(r, \omega) = \sum_{c} O_c(\omega) \left\{ \sum_{r} EH_c(r, \omega) EH_x^*(r, \omega) \right\} + \\ \qquad\qquad B \sum_{r} EH_x^*(r, 0), \\ \sum_{r} D(r, 0) = \sum_{c} O_c(0) \sum_{r} EH_c(r, 0) + B, \end{cases} \quad (10)$$

where x runs through all colors to be resolved. In matrix form, equation (9) reads as follows:

$$[D(r,\omega)]_r [EH_{\hat{c}}(r,\omega)]_{\hat{c},r}^* = [O_{\hat{c}}(\omega)]_{\hat{c}} [X(\omega)]_{\hat{c},\hat{c}}. \quad (11)$$

Here $[X(\omega)]_{\hat{c},\hat{c}} = ([EH_{\hat{c}}(r,\omega)]_{\hat{c},r} [(r,\omega)]_{\hat{c},r}^*)$ applies. The solution to $[O_{\hat{c}}(\omega)]_{\hat{c}}$ supplies:

$$[O_{\hat{c}}(\omega)]_{\hat{c}} = [D(r,\omega)]_r [EH_{\hat{c}}(r,\omega)]_{\hat{c},r}^* [X(\omega)]_{\hat{c},\hat{c}}^{-1} A(\omega). \quad (12)$$

Here, $A(\omega)$ is an apodization filter, for example:

$$A(\omega) = \frac{det\left( [EH_{\hat{c}}(r, \omega)]_{\hat{c},r} [EH_{\hat{c}}(r, \omega)]_{\hat{c},r}^* \right)}{det\left( [EH_{\hat{c}}(r, \omega)]_{\hat{c},r} [EH_{\hat{c}}(r, \omega)]_{\hat{c},r}^* \right) + w(\omega)}. \quad (13)$$

If only one color were present, the following would be obtained in a manner analogous to equation (4):

$$O(\omega) = \frac{[D(r, \omega)]_r [EH(r, \omega)]_r^*}{([EH(r, \omega)]_r [EH(r, \omega)]_r^*) + w(\omega)}. \quad (14)$$

The color resolution capability is defined by the matrix $[X(\omega)]_{\hat{c},\hat{c}}$. In the case of noise-afflicted data, the rows/columns of the matrix $[X(\omega)]_{\hat{c},\hat{c}}$ must be linearly independent for resolving the color. This is already satisfied if the point spread functions for the different colors differ. This was already explained on the basis of FIGS. 3 and 4 using the example of two colors. In this case, the number of resolvable colors is one smaller than the number of increment positions r.

In the case of noisy data, the robustness of the solvability is given by the condition number of the matrix $[X(\omega)]_{\hat{c},\hat{c}}$. In general, the condition number of a matrix S is defined as $\kappa(S)=\|S\|\|S^{-1}\|$. Here, $\|.\|$ denotes the norm of the matrix. The greater the condition number, the less resilient the solution in respect of errors in the input data, i.e. in respect of noise. For noise-free data, a finite condition number, i.e. a value of any size less than infinite, would already suffice for resolving the colors. However, noise-afflicted measurement values are present in reality, which is why the matrix $[X(\omega)]_{\hat{c},\hat{c}}$ is designed such that it has a condition number that is as small as possible. In order to achieve this, the differences in the contributions of various colors, which are produced by the individual point spread functions of the colors on account of the separation and mixing, should be as large as possible at each detector element. In the example of FIG. 4, this is achieved by an approximately orthogonal design of the point spread functions.

As a more general rule, an assignment function is specified for each color, said assignment function linking the location of the detection within the point spread function, r, with the number of the detector element 25, which is given by n: $n=M_c(r)$. Here, the geometry of the detector elements is not important; in particular, the described row-shaped detector elements are possible. Then, the following emerges as a signal of the mixed channels on the detector elements n:

$$D(n, \omega) = \sum_{c} O_c(\omega) EH_c(M_c^{-1}(n), \omega) + bB(\omega). \quad (15)$$

Here, the assignment function has not yet been set. In order to select the assignment function $M_c(r)$, or its inversion, $M_c^{-1}(n)$, appearing in equation (15), the selection should be made in such a way that the condition number of the matrix $[X(\omega)]_{\hat{c},\hat{c}}$ is a small as possible. This is achieved if the difference of the contributions of the various colors over all detector elements n and over all frequencies ω becomes maximal in view of the assignment function $M_{c_i}^{-1}(n)$, I=1, . . . . This leads to the following equation:

$$\max_{M_{c_i}^{-1}(n), i=1,\ldots} \sum_{n} \sum_{\omega} \sum_{\substack{c_i, c_j \\ c_i \neq c_j}} | EH_{c_i}(M_{c_i}^{-1}(n), \omega) - EH_{c_j}(M_{c_j}^{-1}(n), \omega)|. \quad (16)$$

It is easily possible to define the assignment function, i.e. the effect of the splitting and mixing device 30, on the basis of this equation. By way of example, in the construction of FIG. 5, the interchange of the individual optical fibers 21, i.e. their assignment at the input plug 31, and the effect of the individual splitting elements 33 are selected in such a way that equation 16 is maximized.

The measure provided by equation (16) is one possible condition for the selection of the assignment. Other, alternative assignment criteria are likewise suitable. By way of example, instead of an integration over the frequencies ω, it is also possible to define certain frequency bands in which the color separation should be more sensitive than in others. Ultimately, equation (16) or alternative procedures provide a clear assignment rule to be implemented by a person skilled in the art in relation to how the splitting and mixing device has to merge the spectrally divided spatial channels to the mixed channels and how the unmixing should be done.

Figure 6:
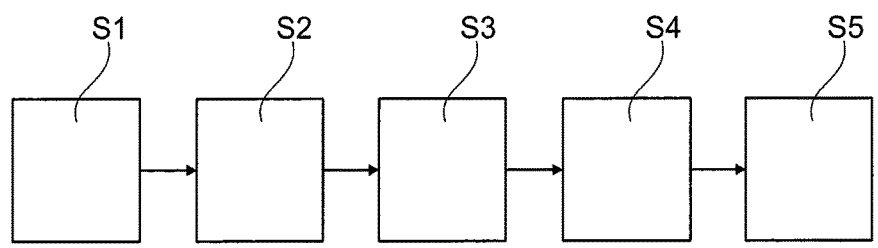
FIG. 6 shows a flowchart for a microscopy method, carried out by the microscope shown in FIG. 1, for high-resolution scanning microscopy distinguishing between at least two spectral bands.

FIG. 6 shows, in an exemplary manner, a flowchart for the microscopy method which can be carried out with the microscope from FIG. 1, for example. In a step S1, conventional Airy scanning microscopy is carried out, as a person skilled in the art already knows from the aforementioned EP 2317362 A1. That is to say, a point on the sample is illuminated in a diffraction-limited manner and imaged in a diffraction-limited manner of a multiplicity of scanning positions on a plane that is conjugate to the focal plane.

In a step S2, the diffraction image is resolved in various spatial channels. This step S2 can also be understood as pixelation. Consequently, a dedicated beam path is generated for each spatial channel.

In a step S3, these individual beam parts of the spatial channels are chromatically divided, with the number of divisions setting the desired number of spectral channels.

In a step S4, the divided spectral channels are merged back to mixed channels in a predetermined manner. The criteria for selecting this mixing process were explained above on the basis of the derivation of equation (16).

Subsequently, the radiation is detected in the mixed channels and the signal is evaluated for producing the highly resolved multi-spectral image in a step S5.

The following deviations or enhancements are possible for the concept illustrated above:

To the extent that only two color channels R, G were described above, this is purely exemplary. Naturally, it is equally possible to use a greater number of color channels.

The division into spatial channels in step S2, the chromatic division in step S3 and the defined mixing in step S4 can also be combined in combinations or, in part, be carried out in a different sequence. Explanations are provided on the basis of FIG. 5 to the extent that the re-sorting of the spatial channels by way of appropriate configurations of the optical fiber bundle 20 and its assignment to the splitting and mixing device 30 can already be part of the defined mixing of step S4. What is essential is that beam paths independent from spatial channels are formed, chromatically split and mixed again in a different fashion. In the embodiment of FIG. 5, this mixing process is already prepared by the involvement of the optical fiber bundle 20. However, this is optional. By way of example, it is also possible to switch in a further optical fiber bundle after the spectral split, said further optical fiber bundle merging the different spectral channels into the desired mix, for example by the use of fiber combiners.

The use of the fiber coupler in the plane that is conjugate to the focal plane 29 renders it possible to parallelize the spatial channels in a crosstalk-free manner. Forming the spatial channels first and then carrying out spectral splitting and mixing is moreover advantageous in that the division into a large multiplicity of spectral channels is easier. However, it is also possible to interchange the sequence of the spectral split and the formation of the spatial channels, i.e. to exchange steps S3 and S2, by virtue of splitting the radiation into a plurality of spectral bands by way of a color splitter upstream of the plane that is conjugate to the focal plane 20. Then, these can be imaged into a fiber bundle by means of micro-lenses and then be mixed together anew in space, for example by multiple occupancy at the detector elements 25.

Embodiments in which all spatial channels, i.e. all radiation of the diffraction image 17, were subjected to the process of spectral split and mixing, were described above. However, it is also possible to leave individual or multiple spatial channels unchanged, either by virtue of these not even being guided via the splitting and mixing device 30 or by virtue of the splitting and mixing device 30 merging the radiation of one or spatial channels in one mixed channel again. This may be advantageous, for example in order to undertake intensity referencing.

Above, there were further explanations to the effect that each mixed channel contains radiation of different spectral channels. This is advantageous in view of unmixing, wherein it is particularly expedient if each mixed channel contains radiation from different spectral channels only. However, here too, it may be advantageous for referencing or normalizing the signal if multiple same spectral channels are merged with radiation originating from different spatial channels in individual mixed channels.

In addition to the described mode of operation, in which a highly resolved image is produced, the microscope 1 can also be operated in a manner which does not produce a highly resolved image but only a spectrum. To this end, intensity data of the detector elements 25 are read for a scanning position and a spectrum of the sample is obtained taking account of the spectral channels assigned to each detector element 25.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed is:

1. A method for high-resolution scanning microscopy of a sample, said method comprising
exciting the sample by illumination radiation to emit fluorescence radiation wherein the illumination radiation is focused to a point in or on the sample to form a diffraction-limited illumination spot,
imaging the point in diffraction-limited manner to a diffraction image on a detection area of a spatially resolving detector device, wherein:
the detection area has spatial channels defining a spatial resolution of the detector device, which resolution resolves a diffraction structure of the diffraction image;
the detector device comprises detector elements for detecting radiation of the diffraction image;
for each of the plurality of the spatial channels, the radiation guided thereto is spectrally divided into multiple spectral channels;
the thus obtained channels are merged to form mixed channels receiving radiation originating from different spatial channels and radiation from various spectral channels; and
each mixed channel is guided to one of the detector elements,
displacing the point relative to the sample into different scanning positions with an increment of less than half the diameter of the illumination spot,
reading intensity data from the detector elements for each scanning position and producing an image of the sample from the intensity data and the scanning positions assigned thereto, said image having a resolution increased beyond a resolution limit for imaging the point, wherein the spectral channels and spatial channels of the radiation are taken into account for each detector element and a multi-spectral image of the sample is produced.

2. The method as claimed in claim 1, wherein k spatial channels, n spectral channels and j detector elements are used and where j<k*n applies, preferably j=k.

3. The method as claimed in claim 1, wherein the number of mixed channels equals the number of spatial channels.

4. The method as claimed in claim 1, further comprising:
forming the detection area by an entry area of a bundle of optical fibers comprising entry facets, wherein the spatial channels begin at the entry facets of the optical fibers in the entry area;
a spectral splitting and mixing device comprises individual splitting elements, wherein the number of individual splitting elements corresponds to a number of spitted spatial channels, and
each optical fiber guides the radiation to one of the individual splitting elements and the individual splitting element divides the radiation into the spectral channels.

5. The method as claimed in claim 1, further comprising providing at least one extra spatial channel the radiation of which extra spatial channel is guided to one of the detector elements without spectral dividing.

6. The method as claimed in claim 1, wherein, for the purposes of quickly recording a spectrum of the fluorescence radiation, intensity data for one scanning position are read and a spectrum of the sample at the scanning position is produced from the intensity data by taking into account the spectral channels assigned to each detector element.

7. The method as claimed in claim 1, wherein the multi-spectral image of the sample is produced by
setting up a system of equations for each scanning position, said system of equations containing one equation for each detector element, wherein the spatial channels and spectral channels assigned to each detector element are contained in each equation, and
solving the system of equations in respect of intensity and spectral data for the sample.

8. A microscope for high-resolution scanning microscopy, the microscope comprising
a sample space for receiving a sample which is excitable to emit fluorescent radiation,
an optical unit which has a focal plane, located in the sample space, and a resolution limit,
an illumination device, which has an entrance for receiving illumination radiation and illuminates, the sample space with the illumination radiation via the optical unit in such a way that the optical unit focuses the illumination radiation to a point in the focal plane to form a diffraction-limited illumination spot,
an imaging device for diffraction-limited imaging of the point in the focal plane to a diffraction image by the optical unit,
a spatially resolving detector device having a detection area lying in a plane that is conjugate to the focal plane, wherein
the detection area comprises spatial channels defining a spatial resolution of the detector device, which resolution resolves a diffraction structure of the diffraction image,
the detector device comprises detector elements for detecting radiation of the diffraction image,
the detector device comprises a splitting and mixing device which, for each of the plurality of the spatial channels, spectrally divides the radiation guided thereto into multiple spectral channels and which merges these together again to form mixed channels, wherein the splitting and mixing device merges radiation originating from different spatial channels into each mixed channel and radiation from various spectral channels into the plurality of mixed channels and guides each mixed channel to one of the detector elements,
a scanning device for displacing the point into different scanning positions with an increment of less than half the diameter of the illumination spot,
an evaluation device for reading intensity data from the detector elements and the scanning positions assigned thereto, and for producing an image of the sample from the intensity data and the scanning positions assigned thereto, said image having a resolution increased beyond the resolution limit of the optical unit, wherein the evaluation device takes into account the spectral channels and spatial channels of the radiation supplied thereto for each detector element and produces a multi-spectral image of the sample.

9. The microscope as claimed in claim 8, comprising k spatial channels, n spectral channels and j detector elements, where j<k*n applies, preferably j=k.

10. The microscope as claimed in claim 8, wherein the number of mixed channels equals the number of spatial channels.

11. The microscope as claimed in claim 8, further comprising at least one extra spatial channel the radiation of which extra spatial channel is guided to one of the detector elements without spectral dividing.

12. The microscope as claimed in claim 8, wherein
the detection area is formed by an entry area of a bundle of optical fibers comprising entry facets, wherein the entry facets of the optical fibers set the start of the spatial channels,
the spectral splitting and mixing device comprises individual splitting elements, wherein the number of individual splitting elements corresponds to a number of spatial channels, and
each optical fiber guides the radiation to one of the individual splitting elements and the individual splitting element divides the radiation into the spectral channels.

* * * * *

UNITED STATES PATENT AND TRADEMARK OFFICE
CERTIFICATE OF CORRECTION

PATENT NO. : 10,401,607 B2
APPLICATION NO. : 15/764238
DATED : September 3, 2019
INVENTOR(S) : Ingo Kleppe, Ralf Wolleschensky and Yauheni Novikau Page 1 of 1

It is certified that error appears in the above-identified patent and that said Letters Patent is hereby corrected as shown below:

In the Specification

Column 14, Line 12 now reads:

" $D(r, p) = \int_r O(p - r')E(r')h(r' + r)dr'$ "

Should read:

-- $D(\mathbf{r},\mathbf{p}) = \int_r O(\mathbf{p} - \mathbf{r}')E(\mathbf{r}')H(\mathbf{r}' + \mathbf{r})d\mathbf{r}'$ --

Column 15, Line 42 now reads:

" $[X(\omega)]_{\hat{c},\hat{c}} = ([EH_{\hat{c}}(r,\omega)]_{\hat{c},r}[(r,\omega)]_{\hat{c},r}^*)$ "

Should read:

-- $[X(\omega)]_{\hat{c},\hat{c}} = ([EH_{\hat{c}}(\mathbf{r},\omega)]_{\hat{c},r}[EH_{\hat{c}}(\mathbf{r},\omega)]_{\hat{c},r}^*)$ --

Column 16, Line 46 now reads:

" $M_{c_i}^{-1}(n), I=1, \ldots$ "

Should read:

-- $M_{c_i}^{-1}(n), i=1, \ldots$ --

Signed and Sealed this
Twenty-ninth Day of October, 2019

Andrei Iancu
*Director of the United States Patent and Trademark Office*